E. C. & R. H. NEGLEY & J. T. CUNNINGHAM.

Apparatus for the Manufacture of Ice.

No. 166,713.        Patented Aug. 17, 1875.

WITNESSES,       INVENTORS.

UNITED STATES PATENT OFFICE.

EDWARD C. NEGLEY, ROBERT H. NEGLEY, AND JOHN T. CUNNINGHAM, OF PITTSBURG, PENNSYLVANIA.

IMPROVEMENT IN APPARATUS FOR THE MANUFACTURE OF ICE.

Specification forming part of Letters Patent No. 166,713, dated August 17, 1875; application filed July 15, 1875.

*To all whom it may concern:*

Be it known that we, E. C. NEGLEY, R. H. NEGLEY, and J. T. CUNNINGHAM, of the city of Pittsburg, county of Allegheny and State of Pennsylvania, have invented certain Improvements in the Manufacture of Ice, of which the following is a specification:

Our improvements in the manufacture of ice relate to that method in which shallow pans or other vessels filled with water are so exposed that the atmosphere has access to all the surfaces of the same, and thus in cold weather freezes and solidifies the contents of the vessel in a more rapid manner than where the frost can act only on the surface of the water.

The first part of our invention is in the formation of the vessel, which will be more fully understood by reference to the accompanying drawing, in which—

Figure 1:
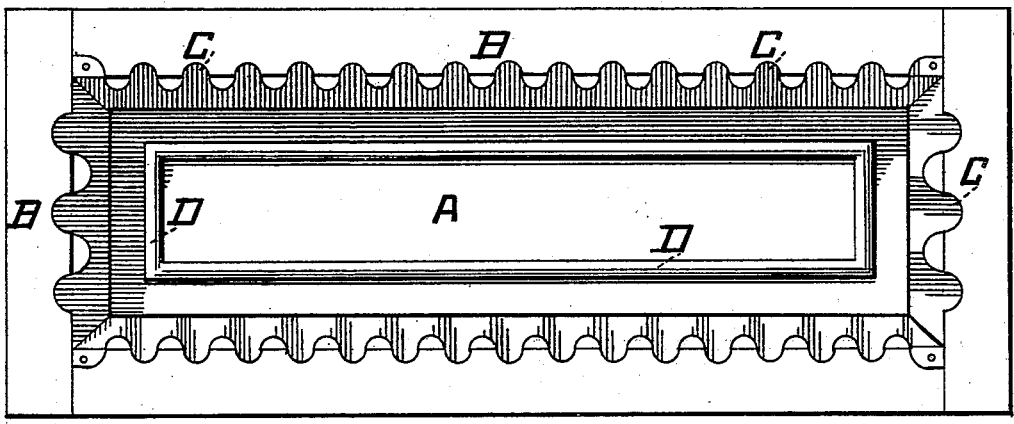
Figure 2:
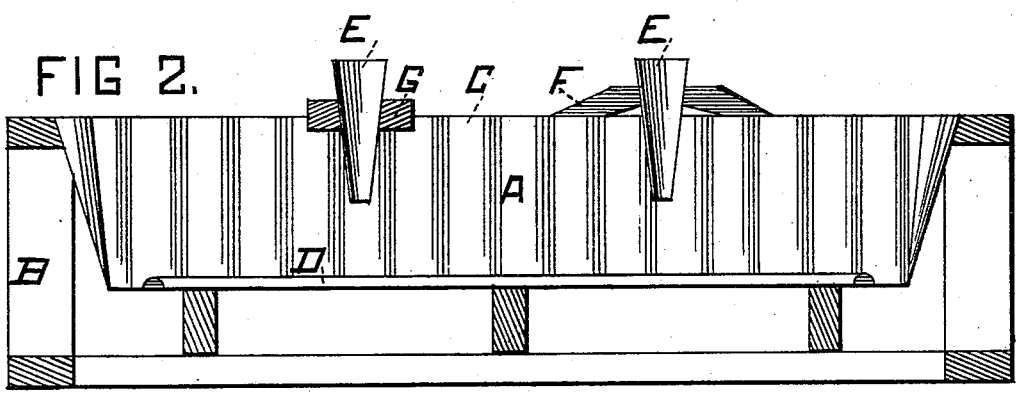
Figure 2:
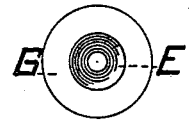
Figure 2:
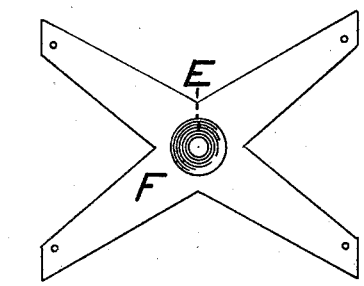

Figure 1 is a top view looking down into the vessel, and Fig. 2 is a longitudinal section of the vessel and its frame or support.

We make the vessel with corrugated sides, and a ribbed or corrugated bottom, the object of which is twofold. In the first place the corrugations and ribs stiffen and strengthen the vessel, and, at the same time, allow a certain amount of flexibility, thus reducing the danger of rupture by the expansive force of the ice to a minimum. In the second place, it, by means of the corrugations and ribs, largely increases the surface upon which the cold atmosphere acts, thus increasing the rapidity with which the ice is formed.

On the drawing, A is the vessel; B B, the supporting-frame. C C C are the corrugations on the top of the sides and ends, decreasing to nothing at the bottom. D D are the ribs upon the bottom.

We do not confine ourselves to any exact form or number of these corrugations or ribs, as they can be varied indefinitely. The vessel can be made of any suitable material, and suspended in any way advisable, so that the atmosphere can have access to all its parts and surfaces.

The second part of our invention is the application of the conical tube marked E on the drawing, and the attachments by which it is suspended or held in position while the water is freezing.

In order to show the value and object of this tube we will explain its use: Water when exposed in these vessels freezes, and the ice forms into a box containing water and a considerable quantity of air. As the freezing continues this air is subject to a heavy pressure, which culminates at about the center of the mass, and, unless relieved, frequently results in the rupture of the vessel or of the ice; through the opening the air escapes, together with a small quantity of water. Another point is, that the water thus frozen under compression assumes a cloudy and dull appearance, and the ice at the center is not transparent. To obviate these difficulties we introduce one or more of the conical tubes E, so that the small end shall be at about the center of the water contained in the vessel. They are suspended by the bridge F, or some analogous device, or may be supported by a float of cork or other wood, marked G, so that the large end of the tube is above the water to be frozen. In the latter case a thin film of ice should be allowed to form on the water, a hole being broken at the point desired. The tube, when inserted, will be retained in position by the surrounding ice, and not drifted out of place by the wind.

The action of the tube is as follows: As the mass freezes, and the pressure concentrates upon the fluid in the center, it forces its way up through the small end of the tube, and, lifting the ice formed therein, it relieves the body of the vessel from the strain, and continues so to do until the block is frozen solid, the tube acting, in fact, as a safety-valve. The ice produced is also of uniform transparency— an important point.

This application is equally advantageous when employed in connection with canvas bags, or where the vessel is made of any material whatever.

We are aware that the method of exposing water in vessels of iron, canvas, and other material, so that all their surfaces are subject to the action of the atmosphere, is not new, (see patents of C. M. Keller and J. Henderson, September 12, 1865, and S. J. Newsham and others, November 1, 1870, and July 14, 1870;) but the vessels heretofore used have all had plane sides and bottoms, and are subject to constant breakage, which our corrugations and ribs overcome, besides increasing the surface exposed to the action of the frost, and thus increasing the rapidity of congelation.

We are also aware that the tube has been known as a philosophical novelty for relieving fluids when freezing, but believe ourselves to be the first who have applied it as herein described for the manufacture of ice.

We therefore claim—

1. A vessel for the manufacture of ice, having corrugated sides and a ribbed or corrugated bottom, substantially as shown and described, and for the purposes mentioned.

2. The conical tube E, substantially as shown and described, and for the purposes mentioned.

3. The combination of the tube E and float G, or bridge F, substantially as shown and described, and for the purpose mentioned.

4. The combination of the corrugated vessel A, the conical tube E, the supporting-bridge F, or the float G, substantially as shown and described, and for the purposes mentioned.

EDWARD COX NEGLEY.
ROBERT HEBERTON NEGLEY.
JOHN TEAZE CUNNINGHAM.

Witnesses:
ROBERT QUAILE WHITTEN,
JOHN GORMLEY CURTIS.